United States Patent
Du et al.

(10) Patent No.: US 11,249,490 B2
(45) Date of Patent: Feb. 15, 2022

(54) SELF-MOVING DEVICE CAPABLE OF AUTOMATICALLY RECOGNIZING AN OBJECT IN FRONT, AND RECOGNITION METHOD THEREOF

(71) Applicant: Positec Power Tools (Suzhou) Co., Ltd., Jiangsu (CN)

(72) Inventors: Jiang Du, Jiangsu (CN); Davide Dalfra, Villimpenta (IT); Dong Wang, Jiangsu (CN); Bincai Lan, Jiangsu (CN)

(73) Assignee: Positec Power Tools (Suzhou) Co., Ltd., Suzhou (CN)

( * ) Notice: Subject to any disclaimer, the term of this patent is extended or adjusted under 35 U.S.C. 154(b) by 251 days.

(21) Appl. No.: 16/250,960

(22) Filed: Jan. 17, 2019

(65) Prior Publication Data
US 2019/0227574 A1 Jul. 25, 2019

Related U.S. Application Data

(63) Continuation of application No. PCT/CN2017/093953, filed on Jul. 21, 2017.

(30) Foreign Application Priority Data

Jul. 21, 2016 (CN) .......................... 201610576271.0
Jul. 21, 2016 (CN) .......................... 201610576272.5

(51) Int. Cl.
*G05D 1/08* (2006.01)
*A01D 34/00* (2006.01)
*A01D 101/00* (2006.01)

(52) U.S. Cl.
CPC ............. *G05D 1/0891* (2013.01); *G05D 1/08* (2013.01); *A01D 34/008* (2013.01); *A01D 2101/00* (2013.01); *G05D 2201/0208* (2013.01)

(58) Field of Classification Search
CPC ........... G05D 1/00; G05D 1/021–0297; G05D 2201/0208; G05D 2201/0215;
(Continued)

(56) References Cited

U.S. PATENT DOCUMENTS

2011/0309967 A1* 12/2011 Choe ..................... G01S 17/87
342/54
2017/0023943 A1* 1/2017 Taira ..................... G01S 7/4026
(Continued)

FOREIGN PATENT DOCUMENTS

CN 1633536 A 6/2005
CN 1666114 A 9/2005
(Continued)

OTHER PUBLICATIONS

D. C. Carmer and L. M. Peterson, "Laser radar in robotics," in Proceedings of the IEEE, vol. 84, No. 2, pp. 299-320, Feb. 1996, doi: 10.1109/5.482232. (Year: 1996).*
(Continued)

*Primary Examiner* — Jeffrey C Boomer
*Assistant Examiner* — Paul Allen
(74) *Attorney, Agent, or Firm* — Westbridge IP LLC

(57) ABSTRACT

A self-moving device capable of automatically recognizing an object in front is provided. The self-moving device includes a signal transmission module, a gradient determination module, and a control module. The signal transmission module transmits recognition signals propagated along at least two different paths. The gradient determination module obtains, according to the recognition signals, a first determination result indicating whether an object in front is a slope. The control module controls a traveling path of the self-moving device according to the first determination result.

12 Claims, 9 Drawing Sheets

(58) Field of Classification Search
CPC ........ G05D 1/0891; G05D 1/08; A01D 34/00; A01D 34/006–008; A01D 75/28–287; A01D 2101/00; A01D 34/008; A47L 9/00; A47L 9/2826; A47L 11/00; A47L 11/4011; A47L 2201/00–06; B60W 60/00; B60W 2552/15; G01C 9/00; G01C 2009/00
USPC .................................................... 701/23–28
See application file for complete search history.

(56) References Cited

U.S. PATENT DOCUMENTS

| | | | | |
|---|---|---|---|---|
| 2017/0229019 | A1* | 8/2017 | Ichinose | G01S 13/878 |
| 2017/0336796 | A1* | 11/2017 | Jun | A47L 9/0488 |

FOREIGN PATENT DOCUMENTS

| | | |
|---|---|---|
| CN | 101305661 A | 11/2008 |
| CN | 101489825 A | 7/2009 |
| CN | 201555580 U | 8/2010 |
| CN | 104380337 A | 2/2015 |
| CN | 204142246 U | 2/2015 |
| CN | 204581162 U | 8/2015 |
| CN | 104950313 A | 9/2015 |
| CN | 105122167 A | 12/2015 |
| CN | 105407774 A | 3/2016 |
| CN | 105563451 A | 5/2016 |
| CN | 105652873 A | 6/2016 |
| CN | 105773626 A | 7/2016 |
| JP | 2006146376 A | 6/2006 |
| KR | 101293057 B1 | 8/2013 |

OTHER PUBLICATIONS

Zhiyu Xiang, "Environmental perception: an application of multi-sensor data fusion to autonomous off-road navigation," IEEE International Conference Mechatronics and Automation, 2005, Niagara Falls, Ont., 2005, pp. 1473-1478 vol. 3, doi: 10.1109/ICMA.2005.1626773. (Year: 2005).*

B. Wei, J. Gao, K. Li and H. Chen, "Navigation and slope detection system design for autonomous mobile robot," 2009 9th International Conference on Electronic Measurement & Instruments, Beijing, 2009, pp. 4-654-4-658, doi: 10.1109/ICEMI.2009.5274672. (Year: 2009).*

D. R. Maidment and D. Tarboton, "Computation of Slope," University of Texas at Austin, Sep. 2011, Revised Dec. 2011 (Year: 2011).*

T. Liu, W. Chen, J. Wang and X. Wu, "Terrain analysis and locomotion control of a hexapod robot on uneven terrain," 2014 9th IEEE Conference on Industrial Electronics and Applications, Hangzhou, 2014, pp. 1959-1964, doi: 10.1109/ICIEA.2014.6931489. (Year: 2014).*

"Slope of a Line," Monterey Institute Developmental Math Course, captured via archive.org Jun. 4, 2016, http://www.montereyinstitute.org/courses/DevelopmentalMath/COURSE_TEXT2_RESOURCE/U13_L2_T1_text_final.html (Year: 2016).*

Jiang Zhu, Yaonan Wang, Hongshan Yu, Haixia Xu and Yiqian Shi, "Obstacle detection and recognition in natural terrain for field mobile robot navigation," 2010 8th World Congress on Intelligent Control and Automation, 2010, pp. 6567-6572, doi: 10.1109/WCICA.2010.5554418. (Year: 2010).*

J. Zhu, Y. Wang, H. Yu, W. Wang and Y. Wen, "Sensing incline terrain for mobile robot autonomous navigation under unknown environment," The 2010 IEEE International Conference on Information and Automation, 2010, pp. 2296-2301, doi: 10.1109/ICINFA.2010.5512426. (Year: 2010).*

Tareen, Shaharyar Ahmed Khan. (2016). Design & Development of The Robust—An Autonomous Mobile Robot. Journal of Space Technology. 6. 14-23. (Year: 2016).*

State Intellectual Property Office of the P.R. China, International Search Report and Written Opinion for PCT/CN2017/093953 dated Oct. 18, 2017, Beijing, China, 11 pages.

Extended European Search Report issued in European Patent Application 17830513.2, dated Feb. 3, 2020.

First Office Action issued in Chinese Patent Application No. 201610576271.0, dated Jun. 19, 2019.

First Office Action issued in Chinese Patent Application No. 201610576272.5, dated Jun. 19, 2019.

First Office Action issued in Chinese Patent Application No. 201780003787.9, dated Aug. 31, 2020.

Liu et al., Terrain analysis and locomotion control of a hexapod robot on uneven terrain, 2014 9th IEEE Conference on Industrial Electronics and Applications, IEEE, pp. 1959-1964, dated Jun. 9, 2014.

Wei et al., Navigation and Slope Detection System Design for Autonomous Mobile Robot, Proceedings of IEEE, pp. 4-654 to 4-658, Piscataway, NJ, USA, dated Aug. 16, 2009.

Xiang, Environmental Perception: an Application of Multi-sensor Data Fusion to Autonomous Off-Road Navigation, Proceedings of IEEE, vol. 3, pp. 1473-1478, Piscataway, NJ, USA, dated Jul. 29, 2005.

* cited by examiner

SELF-MOVING DEVICE CAPABLE OF AUTOMATICALLY RECOGNIZING AN OBJECT IN FRONT, AND RECOGNITION METHOD THEREOF

BACKGROUND

Technical Field

The present invention relates to a self-moving device capable of automatically recognizing an object in front and a recognition method thereof.

Related Art

With ongoing development of computer technologies and artificial intelligence technologies, automatic working systems similar to smart robots start to enter people's lives. A fully-automatic vacuum cleaner usually has a small volume and integrates an environmental sensor, a self-driving system, a vacuum cleaning system, a battery, and a charging system. The vacuum cleaner can navigate and vacuum an indoor area automatically without manual manipulation. When the battery is low, the vacuum cleaner returns to a charging station automatically and is docked for charging, and later continues with navigation and vacuum cleaning. A smart lawn mower can cut grass on a user's lawn automatically and can be charged automatically without intervention of the user. Such an automatic working system no longer needs to be manually managed after being set once, so that users are freed from tedious and time- and labor-consuming housework such as cleaning and lawn maintenance.

A smart lawn mower usually has an obstacle-avoidance function. During working, the smart lawn mower can be effectively prevented from colliding with an obstacle by using the obstacle-avoidance function. In a conventional obstacle-avoidance manner, an ultrasonic transmitter is mounted on the smart lawn mower. The ultrasonic transmitter keeps transmitting ultrasound. The ultrasound is reflected when hitting an obstacle in front. The smart lawn mower determines a distance between the smart lawn mower and the obstacle based on a time difference between the time when the ultrasound is transmitted and the time when the reflected ultrasound is received. When the distance is close to zero, a main controller of the smart lawn mower determines that the smart lawn mower encounters an obstacle and controls the smart lawn mower to steer to avoid the obstacle. However, the conventional obstacle-avoidance manner cannot completely adapt to complex grass cutting conditions. Especially, when the smart lawn mower encounters a slope, by using the working principle of ultrasound, the slope may be recognized as an obstacle by mistake. As a result, the smart lawn mower does not move to the slope to perform cutting, and a user's lawn on a slope cannot get cut.

SUMMARY

To overcome the deficiencies in the prior art, the problem to be resolved by the present invention is to provide a self-moving device capable of automatically recognizing an object in front and a recognition method thereof.

To resolve the foregoing problem, the present invention adopts the following technical solutions:

A self-moving device capable of automatically recognizing an object in front, wherein the self-moving device comprises a signal transmission module, a gradient determination module, and a control module, wherein the signal transmission module transmits recognition signals propagated along at least two different paths; the gradient determination module obtains, according to the recognition signals, a first determination result indicating whether an object in front is a slope; and the control module controls a traveling path of the self-moving device according to the first determination result.

In an embodiment, an operational program is preset in the gradient determination module, and the self-moving device inputs parameters of the recognition signals propagated on the at least two different paths into the operational program to obtain the first determination result indicating whether the object in front is a slope.

In an embodiment, when the first determination result is that the object in front is a slope within a preset angle range, the control module controls the self-moving device to ascend the slope.

In an embodiment, each recognition signal comprises a slope recognition signal, the signal transmission module comprises a first transmission unit and a second transmission unit, and the first transmission unit and the second transmission unit respectively transmit the slope recognition signals propagated along the two different paths.

In an embodiment, the first transmission unit and the second transmission unit are disposed at a first transmission point and a second transmission point at different heights.

In an embodiment, the first transmission unit and the second transmission unit transmit the slope recognition signals respectively in a horizontal direction to obtain a first horizontal distance and a second horizontal distance that are respectively between the first transmission point to the second transmission point to a corresponding point of the object in front.

In an embodiment, the first transmission point and the second transmission point are not in a same vertical plane parallel to a movement direction of the self-moving device.

In an embodiment, the gradient determination module determines, by using a relationship between the first horizontal distance and a vertical height of the corresponding first transmission point and a relationship between the second horizontal distance and a vertical height of the corresponding second transmission point, whether the object in front is a slope.

In an embodiment, the gradient determination module determines, by comparing a ratio of the first horizontal distance to the vertical height of the first transmission point and a ratio of the second horizontal distance to the vertical height of the second transmission point, whether the object in front is a slope.

In an embodiment, when the first transmission point and a foremost position of the object in front are both located in a same vertical plane perpendicular to a movement direction of the self-moving device, the gradient determination module determines, based on whether the ratio of the first horizontal distance to the vertical height of the first transmission point is equal to the ratio of the second horizontal distance to the vertical height of the second transmission point, whether the object in front is a slope, and determines, when the ratio of the first horizontal distance to the vertical height of the first transmission point is equal to the ratio of the second horizontal distance to the vertical height of the second transmission point, that the object in front is a slope.

In an embodiment, the recognition signals propagated on the different paths are propagated along paths at different angles from a movement direction of the self-moving device.

In an embodiment, the signal transmission module comprises a transmission unit that transmits the recognition signals, and the recognition signals propagated on the different paths are transmitted by the same transmission unit.

In an embodiment, the signal transmission module comprises several transmission units that transmit the recognition signals, and the recognition signals propagated on the different paths are transmitted by different transmission units.

In an embodiment, the signal transmission module transmits the recognition signals along at least three different height points.

In an embodiment, the gradient determination module comprises a slope determination module and a gradient recognition module, the slope determination module is configured to determine whether the object in front is a slope, the gradient recognition module is configured to determine an angle of inclination of the slope, and obtain, according to the angle of inclination of the slope, a second determination result indicating whether the self-moving device can pass the slope, when the first determination result is that the object in front is not a slope, the control module controls the traveling path of the self-moving device according to the first determination result, and when the first determination result is that the object in front is a slope, the control module controls the traveling path of the self-moving device according to the second determination result.

In an embodiment, the gradient recognition module comprises an angle setting unit, a gradient analysis unit, and a gradient determination unit, the angle setting unit is configured to set an angle threshold in advance, the gradient analysis unit is configured to determine the angle of inclination of the slope, and the gradient determination unit is configured to compare the angle threshold with the angle of inclination of the slope to determine whether the self-moving device can pass the object in front.

In an embodiment, each recognition signal comprises a slope recognition signal, the signal transmission module comprises a first transmission unit and a second transmission unit, the first transmission unit and the second transmission unit are disposed at a first transmission point and a second transmission point at different heights, the first transmission unit and the second transmission unit transmit the slope recognition signals respectively in a horizontal direction to obtain a first horizontal distance and a second horizontal distance that are respectively between the first transmission point and the second transmission point to a corresponding point of the object in front, and the gradient analysis unit acquires the angle of inclination of the slope according to a ratio of a distance difference between the second horizontal distance and the first horizontal distance to a difference between vertical heights of the corresponding second transmission point and first transmission point.

In an embodiment, each recognition signal comprises a slope recognition signal, the signal transmission module comprises a first transmission unit, the first transmission unit is disposed at the first transmission point, the first transmission unit transmits the slope recognition signals in a horizontal direction to obtain the first horizontal distance between the first transmission point and the corresponding point of the object in front, and when the first transmission point and a foremost position of the object in front are both located in a same vertical plane perpendicular to a movement direction of the self-moving device, the gradient analysis unit acquires the angle of inclination of the slope according to a ratio of the first horizontal distance to the vertical height of the corresponding first transmission point.

In an embodiment, the signal transmission module further receives the recognition signals.

In an embodiment, when the recognition signals encounters the object in front, the recognition signals are reflected back to the self-moving device, and the signal transmission module receives the reflected recognition signals.

In an embodiment, the self-moving device further comprises a signal reception module that receives the recognition signals.

In an embodiment, when the recognition signals encounters the object in front, the recognition signals are reflected back to the self-moving device, and the signal reception module receives the reflected recognition signals.

In an embodiment, the signal transmission module is an ultrasonic transmission module that transmits an ultrasonic signal, and the slope recognition signal is an ultrasonic signal.

In an embodiment, the self-moving device further comprises a width determination module, the width determination module obtains a width of the object in front according to the recognition signals, and obtains, according to the width of the object in front, a third determination result indicating whether the self-moving device can pass the object in front, and the control module controls the traveling path of the self-moving device according to the third determination result.

In an embodiment, each recognition signal further comprises a width recognition signal, the signal transmission module further transmits the width recognition signals propagated along the at least two different paths, the width determination module obtains the width of the object in front according to the width recognition signals, and obtains, according to the width of the object in front, the third determination result indicating whether the self-moving device can pass the object in front, and the control module controls the traveling path of the self-moving device according to the third determination result.

In an embodiment, when the first determination result is that the object in front is not a slope, the control module controls the traveling path of the self-moving device according to the first determination result; when the first determination result is that the object in front is a slope, if the second determination result does not exist, the control module directly controls the traveling path of the self-moving device according to the third determination result; and when the first determination result is that the object in front is a slope and both the second determination result and the third determination result exist, only if both the second determination result and the third determination result indicate that the self-moving device can pass the slope, the control module controls the self-moving device to ascend the slope, and if the second determination result or the third determination result or both the second determination result and the third determination result indicate that the self-moving device cannot pass the slope, the control module controls the self-moving device not to pass the slope.

In an embodiment, the control module comprises a first control unit and a second control unit, wherein the first control unit is configured to control the traveling path of the self-moving device according to the first determination result or the second determination result, and the second control unit is configured to control the traveling path of the self-moving device according to the third determination result.

In an embodiment, the signal transmission module transmits the width recognition signals to different horizontal positions.

In an embodiment, the signal transmission module transmits the width recognition signals at a same height.

In an embodiment, the signal transmission module further receives the width recognition signals.

In an embodiment, the self-moving device further comprises a signal reception module that receives the width recognition signals.

In an embodiment, the signal transmission module is an ultrasonic transmission module that transmits an ultrasonic signal, and the width recognition signal is an ultrasonic signal.

In an embodiment, the width determination module determines whether the width of the object in front is less than a width of the self-moving device to determine whether the self-moving device can pass the object in front, and determines, when the width of the object in front is less than the width of the self-moving device, that the self-moving device cannot pass the object in front.

A method for automatically recognizing an object in front of a self-moving device, wherein the method for automatically recognizing an object in front comprises the following steps:

step 1): providing a signal transmission module, wherein the signal transmission module transmits recognition signals propagated along at least two different paths;

step 2): providing a gradient determination module, wherein the gradient determination module obtains, according to the recognition signals, a first determination result indicating whether an object in front is a slope; and step 3): providing a control module, wherein the control module controls a traveling path of the self-moving device according to the first determination result.

In an embodiment, in step 2), an operational program is preset in the gradient determination module, and the self-moving device inputs parameters propagated on the at least two different paths into the operational program to obtain the first determination result indicating whether the object in front is a slope.

In an embodiment, in step 3), when the first determination result is that the object in front is a slope within a preset angle range, the control module controls the self-moving device to ascend the slope.

In an embodiment, in step 1), each recognition signal comprises a slope recognition signal, and the slope recognition signals are propagated respectively along paths at different heights.

In an embodiment, the slope recognition signals are all propagated in a horizontal direction to obtain a first horizontal distance and a second horizontal distance of at least two different height points from the object in front.

In an embodiment, the slope recognition signals are not propagated in a same vertical plane parallel to a movement direction of the self-moving device.

In an embodiment, in step 2), it is determined, according to relationships between the first horizontal distance and the second horizontal distance and vertical heights of the corresponding height points, whether the object in front is a slope.

In an embodiment, it is determined, by comparing a ratio of the first horizontal distance to the vertical height of the height point corresponding to the first horizontal distance with a ratio of the second horizontal distance to the vertical height of the height point corresponding to the second horizontal distance, whether the object in front is a slope.

In an embodiment, when the height point corresponding to the first horizontal distance and a foremost position of the object in front are both located in a same vertical plane perpendicular to a movement direction of the self-moving device, it is determined, based on whether the ratio of the first horizontal distance to the vertical height of the height point corresponding to the first horizontal distance is equal to the ratio of the second horizontal distance to the vertical height of the height point corresponding to the second horizontal distance, whether the object in front is a slope, and it is determined, when the ratios are equal, that the object in front is a slope.

In an embodiment, the recognition signals propagated on the different paths are propagated along paths at different angles from a movement direction of the self-moving device.

In an embodiment, the signal transmission module comprises a transmission unit that transmits the recognition signals, and the recognition signals propagated on the different paths are transmitted by the same transmission unit.

In an embodiment, the signal transmission module comprises several transmission units that transmit the recognition signals, and the recognition signals propagated on the different paths are transmitted by different transmission units.

In an embodiment, in step 1), the recognition signals are transmitted along at least three different height points.

In an embodiment, when the first determination result in step 2) indicates that the object in front is not a slope, the traveling path of the self-moving device is controlled according to the first determination result in step 3); when the first determination result in step 2) indicates that the object in front is a slope, an angle of inclination of the slope is further determined, a second determination result indicating whether the self-moving device can pass the slope is obtained according to the angle of inclination of the slope, and the traveling path of the self-moving device is controlled according to the second determination result in step 3).

In an embodiment, in step 2), a method for determining whether the self-moving device can pass the slope comprises the following steps:

setting an angle threshold in advance;
determining the angle of inclination of the slope; and
comparing the angle of inclination of the slope with the angle threshold to obtain the second determination result.

In an embodiment, in step 1), slope recognition signals are respectively propagated at different heights in a horizontal direction to obtain a first horizontal distance and a second horizontal distance between at least two different height points and the slope; and a method for determining the angle of inclination of the slope in step 2) comprises determining the angle of inclination of the slope according to ratios of the second horizontal distance and the first horizontal distance to a difference between vertical heights of the corresponding different height points.

In an embodiment, in step 1), at least one of the slope recognition signals is propagated in a horizontal direction to obtain a first horizontal distance between at least one height point and the slope; when the height point and a foremost position of the slope are located in a same vertical plane perpendicular to a movement direction of the self-moving device, a method for determining the angle of inclination of the slope in step 2) comprises determining the angle of inclination of the slope according to a ratio of the first horizontal distance to the vertical height of the height point corresponding to the first horizontal distance.

In an embodiment, in step 1), the signal transmission module transmits the recognition signals propagated along the at least two different paths and receives the recognition signals.

In an embodiment, when the recognition signals encounters the object in front, the recognition signals are reflected back to the self-moving device, and in step 1), the signal transmission module transmits the recognition signals propagated along the at least two different paths and receives the reflected recognition signals.

In an embodiment, in step 1), a signal reception module is further provided, and the signal reception module receives the slope recognition signals.

In an embodiment, when the recognition signals encounters the object in front, the recognition signals are reflected back to the self-moving device, and in step 1), the signal reception module transmits the recognition signals propagated along the at least two different paths and receives the reflected recognition signals.

In an embodiment, the slope recognition signal is an ultrasonic signal.

In an embodiment, when the first determination result in step 2) indicates that the object in front is a slope, step 4) is further comprised after step 3), and step 4) comprises the following steps: providing a width determination module, wherein the width determination module obtains a width of the slope according to the recognition signals, and determining, according to the width of the slope, a third determination result indicating whether the self-moving device can pass the slope; and controlling, by the control module, the traveling path of the self-moving device according to the third determination result.

In an embodiment, in the step of providing a width determination module in step 4), each recognition signal further comprises a width recognition signal, the signal transmission module further transmits the width recognition signals propagated along the at least two different paths, and the width determination module obtains the width of the slope according to the width recognition signals and determines, according to the width of the slope, the third determination result indicating whether the self-moving device can pass the slope.

In an embodiment, if the second determination result does not exist, the traveling path of the self-moving device is directly controlled according to the third determination result; when both the second determination result and the third determination result exist, only if both the second determination result and the third determination result indicate that the self-moving device can pass the slope, the self-moving device is controlled to ascend the slope; and when both the second determination result and the third determination result exist, if the second determination result or the third determination result or both the second determination result and the third determination result indicate that the self-moving device cannot pass the slope, the self-moving device is controlled not to pass the slope.

In an embodiment, in the step of transmitting the width recognition signals in step 4), the width recognition signals are transmitted to different horizontal positions.

In an embodiment, the width recognition signals are transmitted at a same height.

In an embodiment, in the step of transmitting the width recognition signals in step 4), another signal transmission module transmits the width recognition signals propagated along the at least two different paths and receives the width recognition signals.

In an embodiment, in the step of transmitting the width recognition signals in step 4), a signal reception module is further provided, and the signal reception module receives the width recognition signals.

In an embodiment, in the step of transmitting the width recognition signals in step 4), the width recognition signal is an ultrasonic signal.

In an embodiment, the method for determining whether the self-moving device can pass the slope comprises determining, by determining whether the width of the slope is less than a width of the self-moving device, whether the self-moving device can pass the slope, and it is determined, when the width of the slope is less than the width of the self-moving device, that the self-moving device cannot pass the slope.

The beneficial effect of the present invention is: The self-moving device can automatically determine whether an object in front is a slope and intelligently control a traveling path of the self-moving device according to a determination result, thereby improving the working intelligence and safety of the self-moving device.

DETAILED DESCRIPTION

In order to make the objectives, technical solutions, and advantages of the present invention more comprehensible, the present invention is described below in further detail with reference to the embodiments and accompanying drawings. It should be understood that specific embodiments described herein are merely used to explain the present invention instead of limiting the present invention.

FIG. 1 to FIG. 5 show a first embodiment of the present invention.

Figure 1:
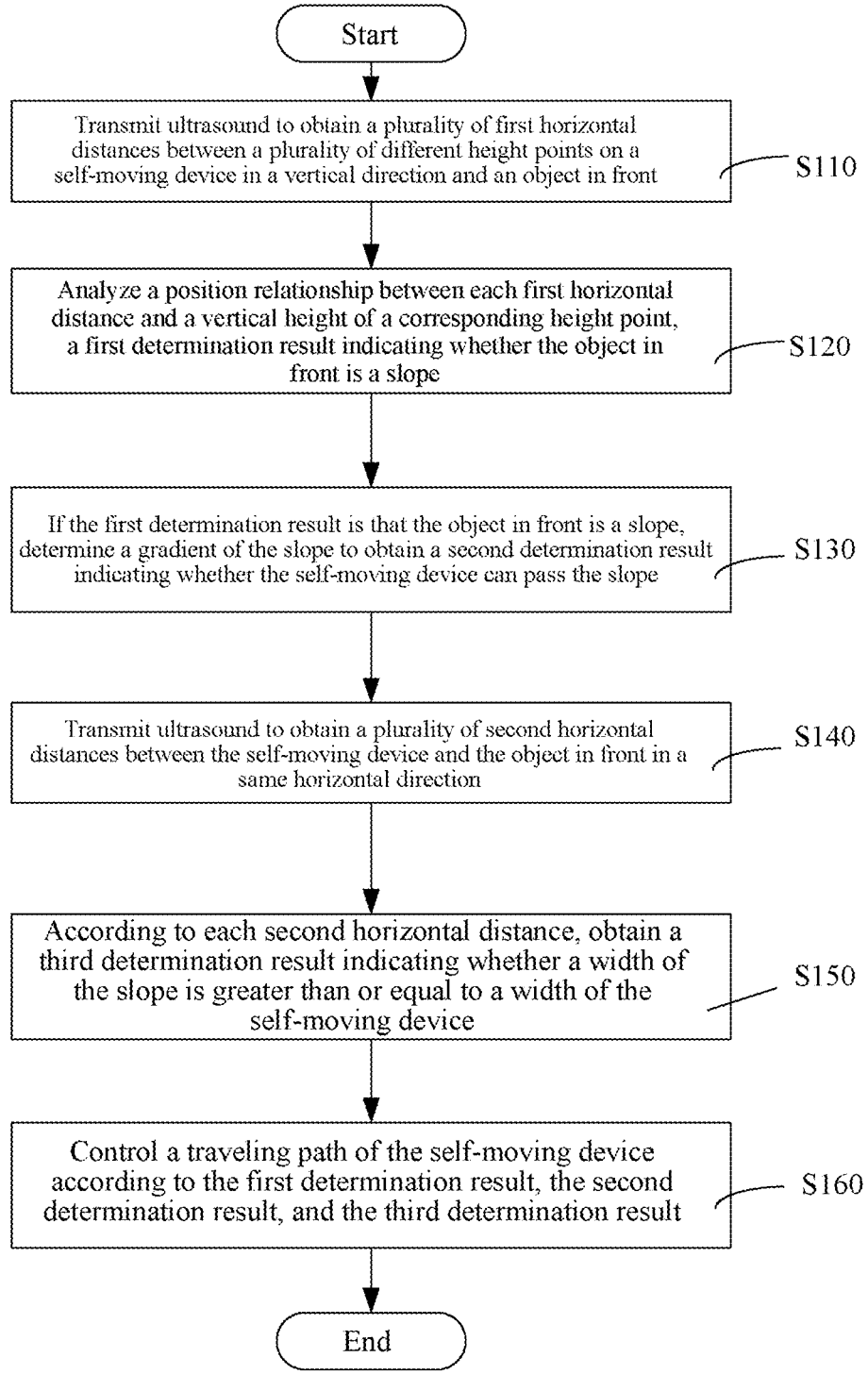
FIG. 1 is a schematic flowchart of a method for automatically recognizing an object in front of a self-moving device according to a first embodiment of the present invention.

As shown in FIG. 1, a method for automatically recognizing an object in front of a self-moving device 100 includes step S110 to step S160. In this embodiment, the self-moving device 100 is an automatic lawn mower.

Step S110: Provide a signal transmission module configured to transmit recognition signals propagated along at least two different paths. In a specific embodiment, the signal transmission module is configured to transmit the recognition signals to obtain a plurality of first horizontal distances between a plurality of different height points on the self-moving device in a vertical direction and an object in front. In this embodiment, the recognition signals are ultrasonic signals. The recognition signals transmitted in step S110 may alternatively be referred to as slope recognition signals.

Figure 2:
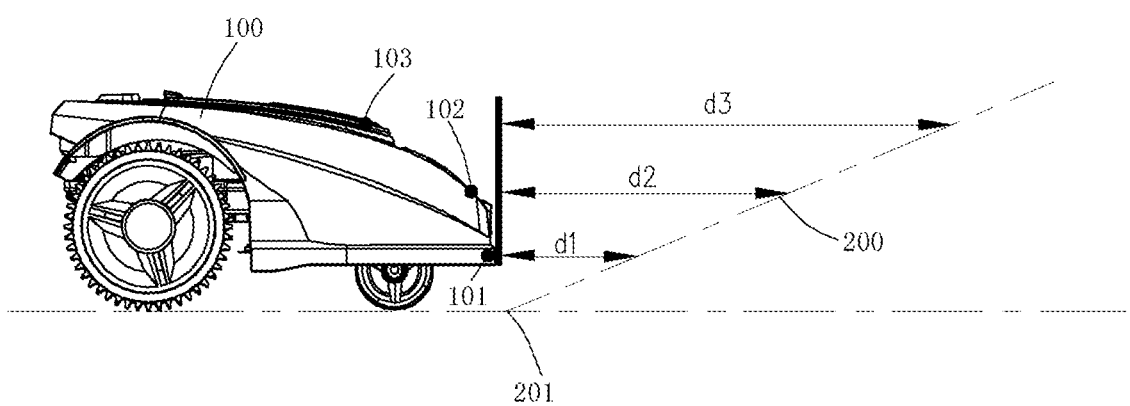
FIG. 2 is a schematic side view of the self-moving device and a slope according to the first embodiment of the present invention.
Figure 3:
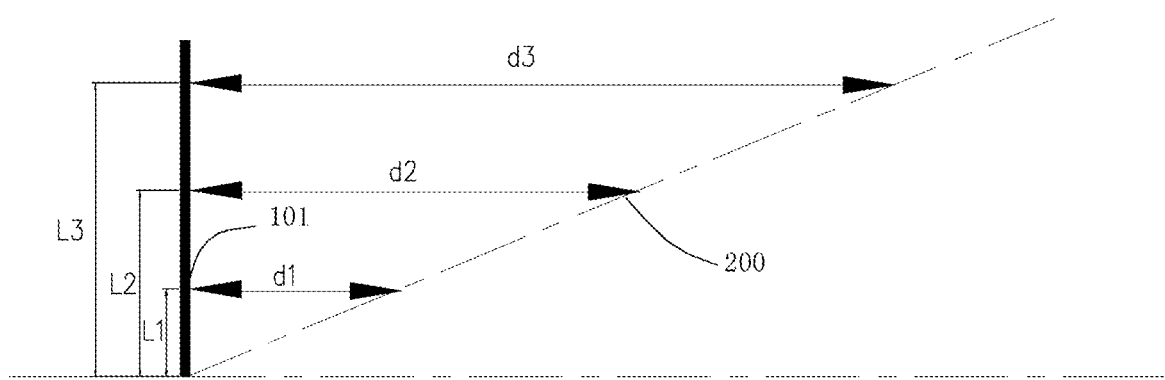
FIG. 3 is a schematic diagram of the self-moving device determining whether an object in front is a slope according to the first embodiment of the present invention.

As shown in FIG. 2, as the self-moving device 100 travels forward, the self-moving device 100 transmits the recognition signals forward and receives reflected recognition signals by using the signal transmission module mounted on the self-moving device 100. In this embodiment, the signal transmission module can transmit a recognition signal and can receive a recognition signal and is disposed by using a structure that integrates transmission and reception. In other embodiments, transmission of a recognition signal and reception of a recognition signal may alternatively be set separately. The signal transmission module is only configured to transmit a recognition signal, and a signal reception module that receives a recognition signal is added on the self-moving device 100. In another embodiment, the added signal reception module that receives a recognition signal may alternatively be disposed on an object other than the self-moving device 100.

The recognition signals may be ultrasonic signals, laser signals, or the like. In this embodiment, ultrasonic signals are used as an example. When the self-moving device 100 encounters an object 200 in front, the self-moving device 100 transmits ultrasound toward the plurality of different height points in front and receives ultrasonic signals reflected back at the corresponding height points by using an ultrasonic transmission module mounted on the self-moving device 100, to obtain horizontal distances between the different height points on the self-moving device 100 and the object 200 in front. FIG. 2 shows height points 101, 102, and 103 on the self-moving device 100.

Step S120: Provide a gradient determination module, where the gradient determination module obtains, according to the recognition signals, a first determination result indicating whether an object in front is a slope. Specifically, the gradient determination module presets an operational program related to parameters propagated on the at least two different paths of the recognition signals. The self-moving device inputs the parameters propagated on the at least two different paths of the recognition signals into the operational program to obtain the first determination result indicating whether the object in front is a slope.

In a specific embodiment, the gradient determination module obtains, by analyzing a position relationship between each first horizontal distance and a vertical height of a corresponding height point, the first determination result indicating whether the object in front is a slope.

The first horizontal distances between the self-moving device 100 and the object 200 in front that are obtained by using the corresponding height points 101, 102, and 103 are respectively d1, d2, and d3. It is obtained, by analyzing position relationships between d1, d2, and d3 and vertical heights L1, L2, and L3 of the corresponding height points, whether the object in front is a slope.

Specifically, when the height point 101 and a foremost position 201 of the object 200 in front are both located in a same vertical plane perpendicular to a movement direction of the self-moving device 100, it is analyzed whether ratios of the horizontal distances d1, d2, and d3 to the vertical heights L1, L2, and L3 of the corresponding height points are equal to recognize whether the object in front is a slope. Further specifically, if the object in front is a slope, as the vertical height increases, the horizontal distances d1, d2, and d3 between the self-moving device and the slope at different height points are also in a sequentially ascending order, and the ratios of the first horizontal distances d1, d2, and d3 to L1, L2, and L3 of the corresponding height points should also be approximately equal, so that the self-moving device may determine, according to whether the ratios of the horizontal distances d1, d2, and d3 to the vertical heights of the corresponding height points are approximately equal, whether the object in front is a slope. Certainly, in consideration of a working environment of the self-moving device, because it is fully considered that a particular error should be allowed for the ratios of the first horizontal distances d1, d2, and d3 to the vertical heights of the corresponding height points, when the ratios of the first horizontal distances d1, d2, and d3 to the vertical heights of the corresponding height points are within specified error ranges, it is considered that the object in front is a slope. Generally, there need to be at least two height points, and preferably, there are at least three height points.

For the measured horizontal distances d1, d2, and d3 between the self-moving device 100 and the object in front, errors caused to the measured horizontal distances d1, d2, and d3 by horizontal distances between the corresponding height points 101, 102, and 103 of the self-moving device 100 should be fully considered. For example, a horizontal position of the height point 101, corresponding to d1, of the self-moving device 100 is used as a reference plane. The actually measured distance d2 should be a distance between the height point 102 corresponding to d2 and the object in front minus a horizontal distance between the height point 102 corresponding to d2 and the height point 101 corresponding to d1. The actually measured distance d3 should be a distance between the height point 103 corresponding to d3 and the object in front minus a horizontal distance between the height point 103 corresponding to d3 and the height point 101 corresponding to d1.

Alternatively, because a distance between the self-moving device 100 and the object in front is far greater than the horizontal distances between the height points 101, 102, and 103 on the self-moving device 100, the horizontal distances between the height points 101, 102, and 103 on the self-moving device 100 may be negligible.

In this embodiment, the gradient determination module obtains, according to the recognition signals, horizontal distances between corresponding points of the self-moving device 100 and the object in front, a corresponding functional expression is preset in an operational program, and the functional relation is used to perform operation to determine whether the object 200 in front is a slope. In other embodiments, all the recognition signals may alternatively be not transmitted in a horizontal direction, and may alternatively be propagated along different paths at different angles from a movement direction of the self-moving device 100. The recognition signals may be transmitted from a same transmission point, and may alternatively be transmitted from different transmission points. In other embodiments, according to actual cases, the gradient determination module may perform operation by using other operational relations in addition to a functional relation.

Step S130: If the first determination result is that the object 200 in front is a slope, determine a gradient of the slope to obtain a second determination result indicating whether the self-moving device 100 can pass the slope.

If the determination result in S120 is that the object 200 in front is a slope, the gradient of the slope can be analyzed to find out whether the self-moving device 100 can pass the slope. Specifically, the gradient of the slope may be determined by using a ratio of the first horizontal distance to a vertical height of the corresponding height point on the slope. Further specifically, a worker may set an angle threshold in advance. The set angle threshold is a gradient range in which the self-moving device can pass the slope. Next, an angle of inclination of the slope is obtained according to the ratio of the first horizontal distance to the vertical height of the corresponding height point and according to the principle of trigonometric functions. The principle is a common technical measure in this field and is therefore not described in detail here in the present invention. Next, the angle threshold is compared with the obtained angle of inclination of the slope to determine whether the self-moving device 100 can pass the slope. If the angle of inclination of the slope obtained according to the ratio of the first horizontal distance to the vertical height of the corresponding height point is within a range of the angle threshold, it is determined that the self-moving device 100 can pass the slope. If the angle of inclination of the slope obtained according to the ratio of the first horizontal distance to the vertical height of the corresponding height point is outside the angle range, it is determined that the self-moving device 100 cannot pass the slope.

The self-moving device capable of automatically recognizing an object in front in the first embodiment of the present invention may further include, in addition to the foregoing steps, comparing a width of the self-moving device 100 with a width of the object in front by using ultrasound to determine whether the self-moving device 100 can pass the slope.

Specifically, in step S140, the signal transmission module further transmits ultrasound to obtain a plurality of second horizontal distances between the self-moving device and the object in front in a same horizontal direction. The ultrasonic signal transmitted in step S140 may alternatively be referred to as a width recognition signal. The slope recognition signal transmitted in step S110 and the width recognition signal transmitted in step S140 may alternatively be generally referred to as recognition signals.

Figure 4:
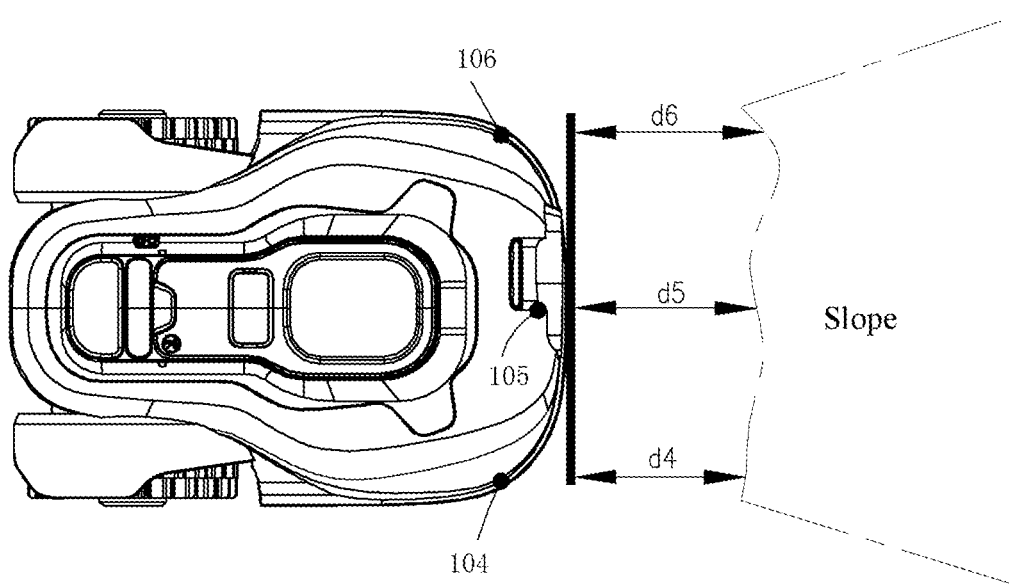
FIG. 4 is a top view of the self-moving device and a slope according to the first embodiment of the present invention.

As shown in FIG. 4, as the self-moving device 100 travels forward, the self-moving device 100 transmits the recognition signals forward by using the signal transmission module mounted on the self-moving device 100 and receives reflected recognition signals. The recognition signals may be ultrasonic signals, laser signals, or the like. In this embodiment, ultrasonic signals are used as an example. When the self-moving device 100 encounters the object 200 in front, by using the ultrasonic transmission module mounted on the self-moving device 100, the self-moving device 100 transmits ultrasound forward to different horizontal positions at a same height and receives ultrasonic signals reflected from the corresponding positions to obtain the second horizontal distances between the self-moving device and the object in front. For different position points 104, 105, and 106 on the self-moving device 100 shown in FIG. 4, distances between the different position points 104, 105, and 106 and the object in front are respectively d4, d5, and d6.

For the measured horizontal distances d4, d5, and d6 between the self-moving device 100 and the object in front, errors caused to the measured horizontal distances d4, d5, and d6 between the corresponding position points 104, 105, and 106 of the self-moving device 100 should be fully considered. In FIG. 4, for example, the position point 105, corresponding to d5, of the self-moving device 100 is used as a reference point, and a vertical plane in which the position point 105 is located and that is perpendicular to a movement direction of the self-moving device 100 is used as a reference plane. The actually measured distance d4 should be a distance between the position point 104 corresponding to d4 and the object in front minus a horizontal distance between the position point 104 corresponding to d4 and the position point 105 corresponding to d5. The actually measured distance d6 should be a distance between the position point 106 corresponding to d6 and the object in front minus a horizontal distance between the position point 106 corresponding to d6 and the position point 105 corresponding to d5.

Alternatively, because a distance between the self-moving device 100 and the object in front is far greater than the horizontal distances between the position points 104, 105, and 106 on the self-moving device 100, the horizontal distances between the position points 104, 105, and 106 on the self-moving device 100 may be negligible.

Step S150: According to each second horizontal distance, obtain a third determination result indicating whether a width of the slope is greater than or equal to a width of the self-moving device. In a specific embodiment, several critical position points may be set on two sides and at a middle position in a width direction of the self-moving device 100. Ultrasonic signals are transmitted from the position points respectively in a movement direction of the self-moving device. If reflected ultrasonic signals can be received at all the position points from the object 200 in front, the second horizontal distances can be obtained, and a difference between the second horizontal distances is within a particular range, it is determined that the width of the slope is not less than the width of the self-moving device. If reflected signals can be received at only some of the disposed position points, the corresponding second horizontal distances are obtained, and a difference between the corresponding second horizontal distances is within a particular range, a width of the object 200 in front is calculated according to the distance between some position points at which reflected signals can be received. In other embodiments, specific positions of the position points and a direction of transmitting ultrasonic signals may also be adjusted, and the width of the object 200 in front is calculated according to an actual case.

In sum, in various specific embodiments, according to the second horizontal distances, a relative relationship between the width of the slope and the width of the self-moving device is determined. When the width of the slope is less than the width of the self-moving device, it is considered that the self-moving device cannot pass the slope.

Step S160: Provide a control module, where the control module controls a traveling path of the self-moving device according to the first determination result, the second determination result, and the third determination result.

Generally, when the first determination result, the second determination result, and the third determination result all indicate that the self-moving device can pass the object in front, the self-moving device is controlled to pass the object (slope) in front. If one of the first determination result, the second determination result, and the third determination result indicates that the self-moving device 100 cannot pass the object 200 in front, the self-moving device 100 is controlled to steer or stop moving forward to avoid passing the object in front.

By using a method for recognizing a slope of the self-moving device, it can be effectively recognized whether there is a slope in front of the self-moving device and determined, if there is a slope, whether the self-moving device can pass the slope, so as to automatically implement cutting on a slope.

In the foregoing embodiment, steps S110 to S160 are all completed, and the first determination result, the second determination result, and the third determination result are all used to determine whether the self-moving device 100 continues to move forward to pass the object in front, that is, ascend the slope. In other embodiments, one or more of step S130 to S150 may alternatively be omitted, and it is directly determined, according to the corresponding first determination result or a combination of the first determination result and one or both of the second determination result and the third determination result, whether the self-moving device 100 continues to move forward. For example, steps S130 to S150 are all omitted, and the control module controls a traveling path of the self-moving device 100 according to only the first determination result. When the first determination result is that the object 200 in front is a slope, the control module controls the self-moving device 100 to pass the object 200 in front. When the first determination result is that the object 200 in front is not a slope, the control module controls the self-moving device 100 not to pass the object 200 in front. For example, the self-moving device 100 may be controlled to steer, turn around, reverse or the like.

Figure 5:
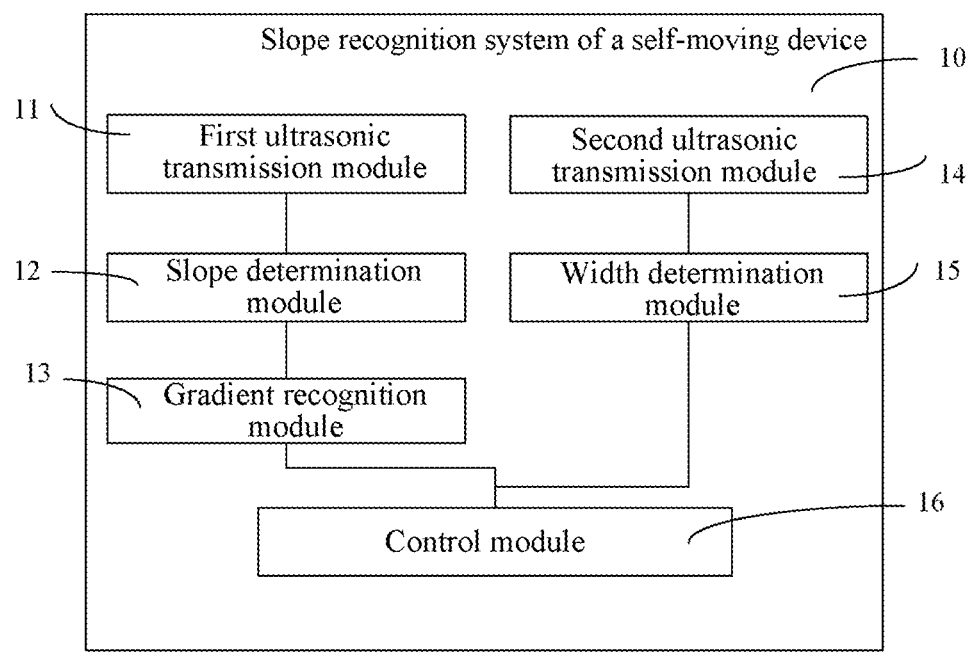
FIG. 5 is a schematic modular diagram of a slope recognition system of the self-moving device according to the first embodiment of the present invention.

As shown in FIG. 5, this embodiment further provides a self-moving device capable of automatically recognizing an object in front 100. The self-moving device 100 includes a slope recognition system 10. The slope recognition system 10 includes:

The first signal transmission module, which is configured to transmit recognition signals propagated along at least two different paths. In a specific embodiment, the first signal transmission module obtains a plurality of first horizontal distances between a plurality of different height points on the self-moving device in a vertical direction and an object in front at by using ultrasound. The first signal transmission module may be an ultrasonic transmission module, a laser transmission module, or the like. In this embodiment, the signal transmission module is a first ultrasonic transmission module 11.

As shown in FIG. 2, the first ultrasonic transmission module 11 includes ultrasonic transmission units and reception apparatuses disposed at different height points in the front of the self-moving device 100. The reception apparatuses are configured to receive ultrasound transmitted back by the corresponding ultrasonic transmission units. As the self-moving device 100 travels forward, the self-moving device 100 transmits an ultrasonic signal forward by using the first ultrasonic transmission module 11 mounted on the self-moving device 100 and receives reflected ultrasonic signals. When the self-moving device 100 encounters an object 200 in front, the self-moving device 100 transmits ultrasound toward the plurality of different height points in front by using the ultrasonic transmission module mounted on the self-moving device and receives, by using the reception apparatuses to receive the ultrasonic signals reflected back at corresponding height points, so as to obtain horizontal distances between the self-moving device and the object in front at the different height points, for example, the height points 101, 102, and 103 on the self-moving device 100 shown in FIG. 2.

The slope determination module 12, which is configured to obtain, according to the recognition signals, a first determination result indicating whether an object in front is a slope. Specifically, the slope determination module presets an operational program related to parameters propagated on the at least two different paths of the recognition signals, and the self-moving device 100 inputs the parameters propagated on the at least two different paths of the recognition signals into the operational program to obtain the first determination result indicating whether the object 200 in front is a slope.

In a specific embodiment, the slope determination module 12 is configured to analyze a position relationship between each first horizontal distance and a vertical height of a corresponding height point to obtain the first determination result indicating whether the object 200 in front is a slope.

The slope determination module 12 obtains that the first horizontal distances between the self-moving device 100 and the object 200 in front that are at the corresponding height points 101, 102, and 103 are respectively d1, d2, and d3, and obtains, by analyzing position relationships between d1, d2, and d3 and vertical heights L1, L2, and L3 of the corresponding height points, whether the object in front is a slope.

Specifically, it is analyzed whether ratios of the horizontal distances d1, d2, and d3 to the vertical heights L1, L2, and L3 of the corresponding height points are equal to recognize whether the object in front is a slope. Further specifically, if the object in front is a slope, as the vertical height increases, the horizontal distances d1, d2, and d3 between the self-moving device and the slope at different height points are also in a sequentially ascending order, and the ratios of the first horizontal distances d1, d2, and d3 to L1, L2, and L3 of the corresponding height points should also be approximately equal, so that the self-moving device may determine, according to whether the ratios of the horizontal distances d1, d2, and d3 to the vertical heights of the corresponding height points are approximately equal, whether the object in front is a slope. Certainly, in consideration of a working environment of the self-moving device, because it is fully considered that a particular error should be allowed for the ratios of the first horizontal distances d1, d2, and d3 to the vertical heights of the corresponding height points, when the ratios of the first horizontal distances d1, d2, and d3 to the vertical heights of the corresponding height points are within specified error ranges, it is considered that the object in front is a slope. Generally, there need to be at least two height points, and preferably, there are at least three height points.

For the measured horizontal distances d1, d2, and d3 between the self-moving device 100 and the object in front, errors caused to the measured horizontal distances d1, d2, and d3 by horizontal distances between the corresponding height points 101, 102, and 103 of the self-moving device 100 should be fully considered. For example, the height point 101, corresponding to d1, of the self-moving device 100 is used as a reference point, and a vertical plane in which the height point 101 is located and that is perpendicular to a movement direction of the self-moving device 100 is used as a reference plane. The actually measured distance d2 should be a distance between the height point 102 corresponding to d2 and the object in front minus a horizontal distance between the height point 102 corresponding to d2 and the height point 101 corresponding to d1. The actually measured distance d3 should be a distance between the height point 103 corresponding to d3 and the object in front minus a horizontal distance between the height point 103 corresponding to d3 and the height point 101 corresponding to d1.

Alternatively, because a distance between the self-moving device 100 and the object in front is far greater than the horizontal distances between the height points 101, 102, and 103 on the self-moving device 100, the horizontal distances between the height points 101, 102, and 103 on the self-moving device 100 may be negligible.

In this embodiment, the slope determination module obtains, according to the recognition signals, horizontal distances between corresponding points of the self-moving device 100 and the object in front, a corresponding functional expression is preset in an operational program, and the functional relation is used to perform operation to determine whether the object 200 in front is a slope. In other embodiments, all the recognition signals may alternatively be not transmitted in a horizontal direction, and may alternatively be propagated along different paths at different angles from a movement direction of the self-moving device 100. The recognition signals may be transmitted from a same transmission point, and may alternatively be transmitted from different transmission points. In other embodiments, according to actual cases, the gradient determination module may perform operation by using other operational relations in addition to a functional relation.

The gradient recognition module 13, which is configured to: if the first determination result is that the object in front is a slope, determine the gradient of the slope to obtain a second determination result indicating whether the self-moving device can pass the slope.

If the determination result is that the object in front is a slope, the gradient recognition module can analyze the gradient of the slope to find out whether the self-moving device can pass the slope. Specifically, the gradient of the slope may be determined by using a ratio of the first horizontal distance to a vertical height of the corresponding height point on the slope. Further specifically, a worker may set an angle threshold in advance. The set angle threshold is a gradient range in which the self-moving device can pass the slope. Next, an angle of inclination of the slope is obtained according to the ratio of the first horizontal distance to the vertical height of the corresponding height point and according to the principle of trigonometric functions. The principle is a common technical measure in this field and is therefore not described in detail here in the present invention. Next, the angle threshold is compared with the obtained angle of inclination of the slope to determine whether the self-moving device can pass the slope. If the angle of inclination of the slope obtained according to the ratio of the first horizontal distance to the vertical height of the corresponding height point is within a range of the angle threshold, it is determined that the self-moving device can pass the slope. If the angle of inclination of the slope obtained according to the ratio of the first horizontal distance to the vertical height of the corresponding height point is outside the angle range, it is determined that the self-moving device cannot pass the slope. The slope determination module 12 and the gradient recognition module 13 are generally referred to as the gradient determination module.

The slope recognition system 10 of the self-moving device may further include: comparing a width of the self-moving device with a width of the object in front by using ultrasound to determine whether the self-moving device can pass the slope. Specifically, the slope recognition system of the self-moving device may further include:

The second signal transmission module, which is configured to transmit recognition signals propagated along at least two different paths. In a specific embodiment, the second signal transmission module is configured to transmit ultrasound to obtain a plurality of second horizontal distances between the self-moving device and the object in front in a same horizontal direction. In this embodiment, the second signal transmission module is a second ultrasonic transmission module 14.

As shown in FIG. 4, as the self-moving device 100 travels forward, the self-moving device 100 transmits ultrasonic signals forward and receives reflected ultrasonic signals by using the second ultrasonic transmission module mounted on the self-moving device 100. When the self-moving device 100 encounters the object 200 in front, the second ultrasonic transmission module generally includes ultrasonic transmission units and ultrasonic sensors. The ultrasonic transmission units and the ultrasonic sensors are generally mounted on the self-moving device. The ultrasonic transmission units transmit ultrasound forward to different horizontal positions at a same height. The ultrasonic sensors are configured to receive reflected ultrasonic signals of the ultrasonic transmission unit at the corresponding positions, so as to obtain the second horizontal distances between the self-moving device and the object in front. For different position points 104, 105, and 106 on the self-moving device 100 shown in FIG. 4, distances between the different position points 104, 105, and 106 and the object in front are respectively d4, d5, and d6.

For the measured horizontal distances d4, d5, and d6 between the self-moving device 100 and the object in front, errors caused to the measured horizontal distances d4, d5, and d6 horizontal distances between the corresponding position points 104, 105, and 106 of the self-moving device 100 should be fully considered. For example, the position point 105, corresponding to d5, of the self-moving device 100 is used as a reference point, and a vertical plane in which the position point 105 is located and that is perpendicular to a movement direction of the self-moving device 100 is used as a reference plane. The actually measured distance d4 should be a distance between the position point 104 corresponding to d4 and the object in front minus a horizontal distance between the position point 104 corresponding to d4 and the position point 105 corresponding to d5. The actually measured distance d6 should be a distance between the position point 106 corresponding to d6 and the object in front minus a horizontal distance between the position point 106 corresponding to d6 and the position point 105 corresponding to d5.

Alternatively, because a distance between the self-moving device 100 and the object in front is far greater than the horizontal distances between the position points 104, 105, and 106 on the self-moving device 100, the horizontal distances between the position points 104, 105, and 106 on the self-moving device 100 may be negligible.

The width determination module 15 is configured to obtain, according to each second horizontal distance, a third determination result indicating whether a width of the slope is greater than or equal to the width of the self-moving device.

The width determination module 15 determines a relative relationship between the width of the slope and the width of the self-moving device according to the second horizontal distances, and determines, when the width of the slope is less than the width of the self-moving device, that the self-moving device cannot pass the slope.

The control module 16 has a first control unit and a second control unit. The first control unit is configured to control the traveling path of the self-moving device according to the first determination result or the second determination result. The second control unit is configured to control the traveling path of the self-moving device according to the third determination result.

Generally, when the first determination result, the second determination result, and the third determination result all indicate that the self-moving device can pass the object in front, the control module 16 controls the self-moving device to pass the object (slope) in front. If one of the first determination result, the second determination result, and the third determination result indicates that the self-moving device cannot pass the object in front, the self-moving device is controlled to steer or stop moving forward to avoid passing the object in front.

The slope recognition system 10 of the self-moving device can effectively recognize whether there is a slope in front of the self-moving device, and determine, if there is a slope, whether the self-moving device can pass the slope, so as to automatically implement cutting on a slope.

In the foregoing embodiments, the first signal transmission module and the second signal transmission module may be generally referred to as the signal transmission module. The recognition signals transmitted by the first signal transmission module may alternatively be referred to as slope recognition signals. The signals transmitted by the second signal transmission module may alternatively be referred to as width recognition signals. The slope recognition signals and the width recognition signals may be generally referred to as recognition signals.

In the foregoing embodiment, the first determination result, the second determination result, and the third determination result are all used to determine whether the self-moving device 100 continues to move forward to pass the object in front. In other embodiments, one or both of the second determination result and the third determination result may alternatively be omitted, and it is directly determined, according to the corresponding first determination result or a combination of the first determination result and one or both of the second determination result and the third determination result, whether the self-moving device 100 continues to move forward. For example, the first determination result and the second determination result are both omitted. The control module controls the traveling path of the self-moving device 100 according to only the first determination result. When the first determination result is that the object 200 in front is a slope, the control module controls the self-moving device 100 to pass the object 200 in front. When the first determination result is that the object 200 in front is not a slope, the control module controls the self-moving device 100 not to pass the object 200 in front. For example, the self-moving device 100 may be controlled to steer, turn around, reverse or the like.

FIG. 6 to FIG. 9 show a second embodiment of the present invention.

Figure 6:
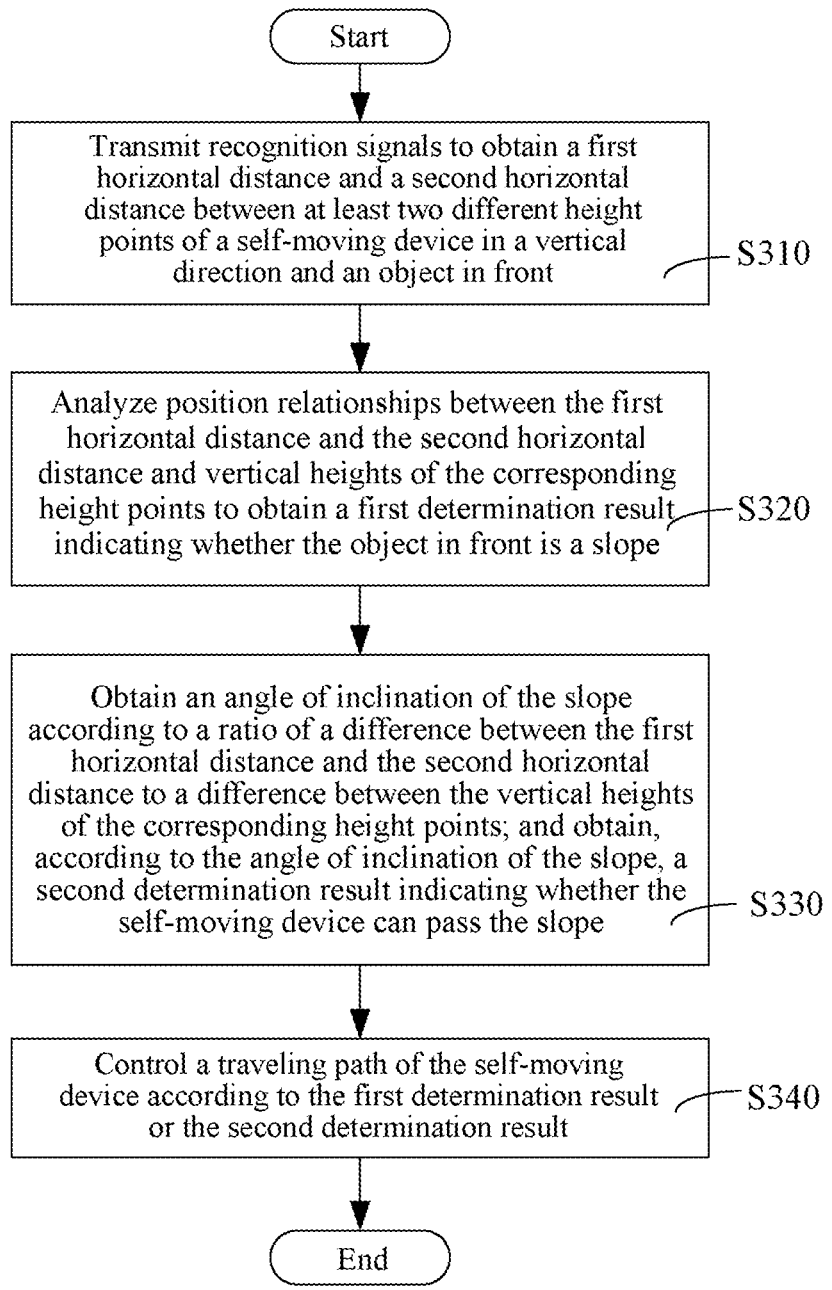
FIG. 6 is a schematic flowchart of a method for automatically recognizing an object in front of a self-moving device according to a second embodiment of the present invention.

As shown in FIG. 6, the second embodiment of the present invention discloses a method for automatically recognizing an object in front of a self-moving device. The method includes the following steps:

Step S310: Transmit recognition signals to obtain a first horizontal distance and a second horizontal distance between at least two different height points of the self-moving device in a vertical direction and an object in front.

Figure 7:
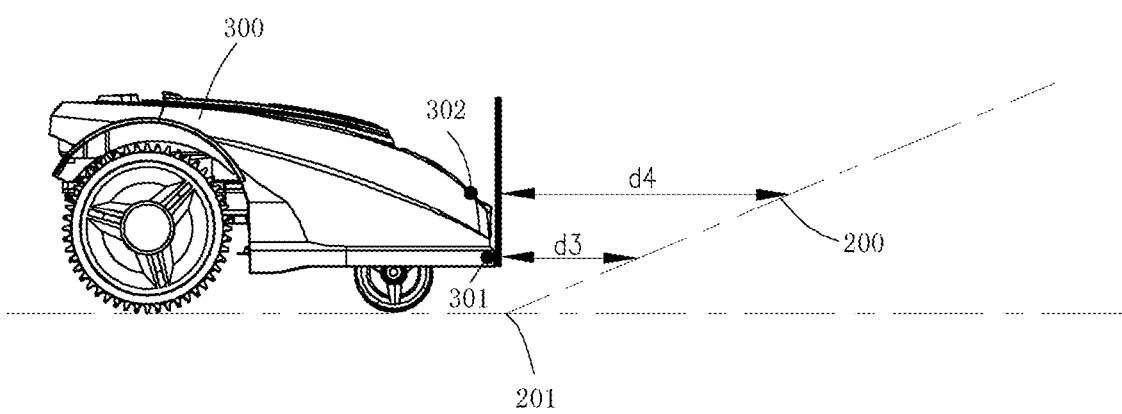
FIG. 7 is a schematic side view of the self-moving device and a slope according to the second embodiment of the present invention.

As shown in FIG. 7, as a self-moving device 300 travels forward, the self-moving device 300 transmits the recognition signals forward and receives reflected recognition signals by using the signal transmission module mounted on the self-moving device 300. When the self-moving device 300 encounters an object 200 in front, the self-moving device 300 transmits ultrasonic signals or laser signals to at least two different height points in front by using the signal transmission module mounted on the self-moving device. In this embodiment, the recognition signals are ultrasonic signals, and ultrasonic signals transmitted from corresponding height points are received, so as to obtain a first horizontal distance d3 and a second horizontal distance d4 between the self-moving device 300 and the object in front. The height points are height points 301 and 302 on the self-moving device 300 shown in FIG. 2.

Step S320: Analyze position relationships between the first horizontal distance d3 and the second horizontal distance d4 and vertical heights of the corresponding height points 301 and 302 to obtain a first determination result indicating whetherself-moving the object in front is a slope.

The first horizontal distance d3 and the second horizontal distance d4 between the self-moving device 300 and the object 200 in front are obtained at the corresponding height points 301 and 302, and it is obtained, by analyzing position relationships between d3 and d4 and the vertical heights of the corresponding height points L3 and L4, whether the object in front is a slope.

Specifically, when the height point 301 and a foremost position 201 of the object 200 in front are both located in a same vertical plane perpendicular to a movement direction of the self-moving device 300, it is analyzed whether a ratio of the first horizontal distance d3 to the vertical height L3 of the corresponding height point is equal to a ratio of the second horizontal distance d4 to the vertical height L4 of the corresponding height point to recognize whether the object in front is a slope. Further specifically, if the object in front is a slope, for distances between the self-moving device and the slope at different height points, the ratio of the first horizontal distance d3 to the vertical height L3 of the corresponding height point is approximately equal to the ratio of the second horizontal distance d4 to the vertical height L4 of the corresponding height point, so that the self-moving device may determine, according to whether the ratios of the horizontal distances d3 and d4 to the vertical heights of the corresponding height points are approximately equal, whether the object in front is a slope. Certainly, in consideration of a working environment of the self-moving device, because it is fully considered that a particular error should be allowed for a difference between the ratio of the first horizontal distance d3 to L3 of the corresponding height point and the ratio of the second horizontal distance d4 to the vertical height L4 of the corresponding height point, when the difference between the ratio of the first horizontal distance d3 to L3 of the corresponding height point and the ratio of the second horizontal distance d4 to the vertical height L4 of the corresponding height point is within a specified error range, it is considered that the object in front is a slope.

Step S330: Obtain an angle of inclination of the slope according to a ratio of a difference between the first horizontal distance d3 and the second horizontal distance d4 to a difference between the vertical heights of the corresponding height points 301 and 302; and obtain, according to the angle of inclination of the slope, a second determination result indicating whether the self-moving device can pass the slope.

If the determination result in S320 is that the object 200 in front is a slope, the gradient of the slope can be analyzed to find out whether the self-moving device can pass the slope. Specifically, the angle of inclination of the slope is obtained according to the ratio of the difference between the first horizontal distance d3 and the second horizontal distance d4 to the difference between the vertical heights L3 and L4 of the corresponding height points. Further specifically, a worker may set an angle threshold in advance. The set angle threshold is a gradient range in which the self-moving device can pass the slope. Next, the angle of inclination of the slope is obtained according to the ratio of the difference between the first horizontal distance d3 and the second horizontal distance d4 to the difference between the vertical heights L3 and L4 of the corresponding height points and according to the principle of trigonometric functions. Next, the angle threshold is compared with the obtained angle of inclination of the slope to determine whether the self-moving device can pass the slope. If the angle of inclination of the slope obtained according to a ratio of a difference between two adjacent first horizontal distances to a difference between the vertical heights of the corresponding height points is within a range of the angle threshold, it is determined that the self-moving device can pass the slope. If the angle of inclination of the slope obtained according to the ratio of the difference between the first horizontal distance and the second horizontal distance to the difference between the vertical heights of the corresponding height points is outside the angle range, it is determined that the self-moving device 300 cannot pass the slope.

To avoid mutual interference between ultrasonic signals for obtaining the first horizontal distances at different height points, a recognition signal used for detecting the first horizontal distance d3 and a recognition signal used for detecting the second horizontal distance d4 are not in a same vertical plane.

Step S340: Control a traveling path of the self-moving device according to the first determination result or the second determination result.

Generally, when the first determination result and the second determination result both determine that the self-moving device can pass the object in front, the self-moving device is controlled to pass the object (slope) in front. If either of the first determination result and the second determination result determines that the self-moving device cannot pass the object in front, the self-moving device is controlled to steer or stop moving forward to avoid passing the object in front.

By using a method for recognizing a slope of the self-moving device, it can be effectively recognized whether there is a slope in front of the self-moving device and determined, if there is a slope, whether the self-moving device can pass the slope, so as to automatically implement cutting on a slope.

Figure 8:
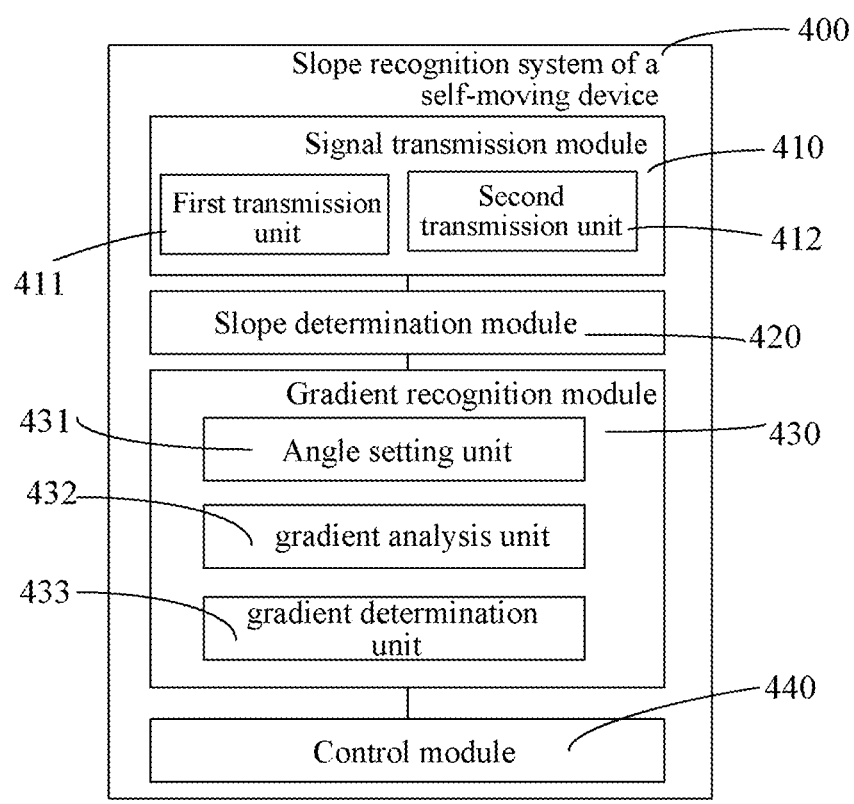
FIG. 8 is a schematic modular diagram of a slope recognition system of the self-moving device according to the second embodiment of the present invention.

As shown in FIG. 8, the present invention further provides a self-moving device 300. The self-moving device 300 includes a slope recognition system 400. The slope recognition system 400 includes:

The signal transmission module, which has a first transmission unit and a second transmission unit. The first transmission unit and the second transmission unit respectively transmit recognition signals to obtain a first horizontal distance and a second horizontal distance between at least two different height points in a vertical direction of the self-moving device and an object in front.

As shown in FIG. 8, a first transmission unit 411 and a second transmission unit 412 may be ultrasonic transmission units configured to transmit ultrasonic signals, or may be laser transmission units configured to transmit laser signals. The present invention is not limited thereto. In this embodiment, ultrasonic transmission units are used as an example. The first transmission unit 411 and the second transmission unit 412 are located at different heights. As the self-moving device 300 travels forward, the self-moving device 300 transmits ultrasonic signals forward and receives reflected ultrasonic signals by using an ultrasonic transmission module 410 mounted on the self-moving device 300. When the self-moving device 300 encounters an object 200 in front, by using the first transmission unit 411 and the second transmission unit 412 of the self-moving device that are mounted in the ultrasonic transmission module 410, the self-moving device 300 transmits ultrasound to at least two different height points in front and receives ultrasonic signals transmitted from the corresponding height points, so as to obtain a first horizontal distance d3 and a second horizontal distance d4 between the different height points and the object in front. The height points are the height points 301 and 302 on the self-moving device 300 shown in FIG. 7.

The slope determination module 420 analyzes whether a ratio of the first horizontal distance to the vertical height of the corresponding height point is equal to a ratio of the second horizontal distance to the vertical height of the corresponding height point.

The first horizontal distance d3 and the second horizontal distance d4 between the corresponding height points 301 and 302 of the self-moving device 300 and the object 200 in front are obtained, and it is obtained, by analyzing position relationships between d3 and d4 and the vertical heights of the corresponding height points L3 and L4, whether the object in front is a slope.

Specifically, the slope determination module 420 includes a slope recognition unit. The slope recognition unit recognizes, by analyzing whether a ratio of the first horizontal distance d3 to the vertical height L3 of the corresponding height point is equal to a ratio of the second horizontal distance d4 to the vertical height L4 of the corresponding height point, whether the object in front is a slope. Further specifically, if the object in front is a slope, for distances between the self-moving device and the slope at different height points, the ratio of the first horizontal distance d3 to the vertical height L3 of the corresponding height point is approximately equal to the ratio of the second horizontal distance d4 to the vertical height L4 of the corresponding height point, so that the self-moving device 300 may determine, according to whether the ratios of the horizontal distances d3 and d4 to the vertical heights of the corresponding height points are approximately equal, whether the object in front is a slope. Certainly, in consideration of a working environment of the self-moving device, because it is fully considered that a particular error should be allowed for a difference between the ratio of the first horizontal distance d3 to L3 of the corresponding height point and the ratio of the second horizontal distance d4 to the vertical height L4 of the corresponding height point, when the difference between the ratio of the first horizontal distance d3 to L3 of the corresponding height point and the ratio of the second horizontal distance d4 to the vertical height L4 of the corresponding height point is within a specified error range, it is considered that the object in front is a slope.

The gradient recognition module 430 obtains an angle of inclination of the slope according to a ratio of a difference between the first horizontal distance and the second horizontal distance to a difference between the vertical heights of the corresponding height points; and obtains, according to the angle of inclination of the slope, a second determination result indicating whether the self-moving device can pass the slope.

The determination result of the slope determination module is that the object in front is a slope, and the gradient of the slope can be analyzed to find out whether the self-moving device 300 can pass the slope 200. Specifically, the angle of inclination of the slope is obtained according to the ratio of the difference between the first horizontal distance d3 and the second horizontal distance d4 to the difference between the vertical heights L3 and L4 of the corresponding height points. Further specifically, the gradient recognition module 430 includes an angle setting unit 431, a gradient analysis unit 432, and a gradient determination unit 433. A worker may set an angle threshold in advance by using the angle setting unit 431. The set angle threshold is a gradient range in which the self-moving device 300 can pass the slope 200. Next, the gradient analysis unit 432 obtains the angle of inclination of the slope according to the ratio of the difference between the first horizontal distance d3 and the second horizontal distance d4 to the difference between the vertical heights L3 and L4 of the corresponding height points and according to the principle of trigonometric functions. Next, the gradient determination unit 433 compares the angle threshold with the obtained angle of inclination of the slope to determine whether the self-moving device can pass the slope. If the angle of inclination of the slope obtained according to the ratio of the difference between the first horizontal distance d3 and the second horizontal distance d4 to the difference between the vertical heights L3 and L4 of the corresponding height points is within a range of the angle threshold set by the angle setting unit 431, it is determined that the self-moving device can pass the slope. If the angle of inclination of the slope obtained according to the ratio of the difference between the first horizontal distance d3 and the second horizontal distance d4 to the difference between the vertical heights of the corresponding height points is outside the angle range, it is determined that the self-moving device cannot pass the slope.

Figure 9:
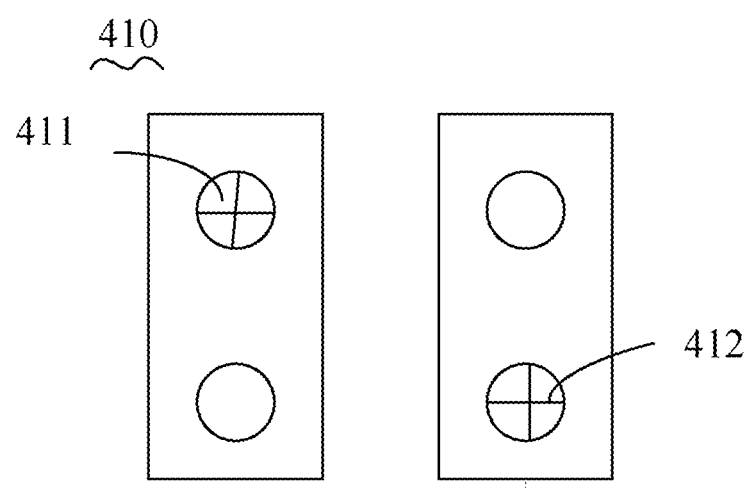
FIG. 9 is a partial schematic structural diagram of the slope recognition system of the self-moving device according to the second embodiment of the present invention.

To avoid mutual interference between ultrasonic signals for obtaining the first horizontal distances at different height points, as shown in FIG. 9, the first transmission unit 411 and the second transmission unit 412 are not in a same vertical plane parallel to a movement direction of the self-moving device 300. In an optimal embodiment, the first transmission unit 411 and the second transmission unit 412 are not in a same vertical plane parallel to a movement direction of the self-moving device 300 and are not in a same vertical plane perpendicular to a movement direction of the self-moving device 300. The first transmission unit 411 and the second transmission unit 412 may transmit the recognition signals simultaneously or may work alternately to avoid signal interference. In an optimal embodiment, the first transmission unit 411 and the second transmission unit 412 do not work simultaneously and need to work alternately to avoid mutual interference. That is, when the first transmission unit 411 is working, the second transmission unit 412 is forbidden to work, and when the second transmission unit 412 is working, the first transmission unit 411 is forbidden to work.

A control module 440 is configured to control the traveling path of the self-moving device according to the first determination result or the second determination result.

Generally, when the first determination result and the second determination result both determine that the self-moving device can pass the object in front, the self-moving device is controlled to pass the object (slope) in front. If either of the first determination result and the second determination result indicates that the self-moving device cannot pass the object in front, the self-moving device is controlled to steer or stop moving forward to avoid passing the object in front.

The self-moving device 300 can effectively recognize whether there is a slope in front of the self-moving device, and determine, if there is a slope, whether the self-moving device can pass the slope, so as to automatically implement cutting on a slope.

In the foregoing embodiments, the signal transmission modules can transmit a recognition signal and can receive a recognition signal and are disposed by using a structure that integrates transmission and reception. In other embodiments, transmission of a recognition signal and reception of a recognition signal may alternatively be set separately. The signal transmission modules are only configured to transmit a recognition signal, and signal reception modules that receive a recognition signal are added on the self-moving devices 100 and 300. In another embodiment, the added signal reception modules that receive a recognition signal may alternatively be disposed on objects other than the self-moving devices 100 and 300.

The technical features in the foregoing embodiments may be randomly combined. For simplicity of description, all possible combinations of the technical features in the foregoing embodiments are not described. However, it should be considered that these combinations of technical features fall within the scope recorded in the specification provided that these combinations of technical features do not have any conflict.

The foregoing embodiments only describe several implementation manners of the present invention, and their description is specific and detailed, but cannot therefore be understood as a limitation to the patent scope of the present invention. It should be noted that a person of ordinary skill in the art may further make variations and improvements without departing from the conception of the present invention, and these all fall within the protection scope of the present invention. Therefore, the patent protection scope of the present invention should be subject to the appended claims.

What is claimed is:

1. A self-moving device capable of automatically recognizing an object in front, wherein the self-moving device is configured to:
   transmit slope recognition signals respectively propagated along at least two different paths in a horizontal direction, to obtain a first horizontal distance and a second horizontal distance that are respectively between a first transmission point and a second transmission point and corresponding points of the object in front;
   determine whether the object in front is a slope, by comparing a ratio of the first horizontal distance to a vertical height of the first transmission point and a ratio of the second horizontal distance to a vertical height of the second transmission point;
   acquire, when the object in front is a slope, an angle of inclination of the slope, according to a ratio of a distance difference between the second horizontal distance and the first horizontal distance to a difference between vertical heights of the corresponding second transmission point and first transmission point;
   determine whether the self-moving device can pass the object in front, by comparing the angle of inclination of the slope with an angle threshold; and
   control the self-moving device to ascend the slope, when it is determined that the self-moving device can pass the object in front.

2. The self-moving device according to claim 1, wherein the first transmission point and the second transmission point are disposed at different heights.

3. The self-moving device according to claim 2, wherein the first transmission point and the second transmission point are not in a same vertical plane parallel to a movement direction of the self-moving device.

4. The self-moving device according to claim 1, wherein the self-moving device further comprises a laser transmission unit that transmits a laser signal, and the slope recognition signal.

5. The self-moving device according to claim 1, wherein the self-moving device is configured to determine, based on whether the ratio of the first horizontal distance to the vertical height of the first transmission point is equal to the ratio of the second horizontal distance to the vertical height of the second transmission point, whether the object in front is a slope, and determines, when the ratio of the first horizontal distance to the vertical height of the first transmission point is equal to the ratio of the second horizontal distance to the vertical height of the second transmission point, that the object in front is a slope.

6. The self-moving device according to claim 1, wherein the self-moving device further receives the slope recognition signals.

7. The self-moving device according to claim 1, wherein the self-moving device further comprises an ultrasonic transmission unit that transmits an ultrasonic signal, and the slope recognition signal is an ultrasonic signal.

8. A method for automatically recognizing an object in front of a self-moving device, the method comprising:
    transmitting slope recognition signals respectively propagated along at least two different paths in a horizontal direction, to obtain a first horizontal distance and a second horizontal distance that are respectively between a first transmission point and a second transmission point and corresponding points of the object in front;
    determining whether the object in front is a slope, by comparing a ratio of the first horizontal distance to a vertical height of the first transmission point and a ratio of the second horizontal distance to a vertical height of the second transmission point;
    acquiring, when the object in front is a slope, an angle of inclination of the slope according to a ratio of a distance difference between the second horizontal distance and the first horizontal distance to a difference between vertical heights of the corresponding second transmission point and first transmission point;
    determining whether the self-moving device can pass the object in front, by comparing the angle of inclination of the slope with an angle threshold; and
    controlling the self-moving device to ascend the slope, when it is determined that the self-moving device can pass the object in front.

9. The method for automatically recognizing an object in front according to claim 8, wherein the determining whether the object in front is a slope, by comparing a ratio of the first horizontal distance to a vertical height of the first transmission point and a ratio of the second horizontal distance to a vertical height of the second transmission point, comprises:
    determining the object in front is a slope, when the ratio of the first horizontal distance to the vertical height of the first transmission point is equal to the ratio of the second horizontal distance to the vertical height of the second transmission point.

10. The method for automatically recognizing an object in front according to claim 8, wherein the slope recognition signal is a laser signal.

11. The method for automatically recognizing an object in front according to claim 8, wherein the first transmission point and the second transmission point are disposed at different heights.

12. The method for automatically recognizing an object in front according to claim 8, wherein the slope recognition signal is an ultrasonic signal.

* * * * *